(12) United States Patent
Newton

(10) Patent No.: US 10,749,945 B2
(45) Date of Patent: Aug. 18, 2020

(54) CROSS-CLUSTER DIRECT SERVER RETURN WITH ANYCAST RENDEZVOUS IN A CONTENT DELIVERY NETWORK (CDN)

(71) Applicant: Level 3 Communications, LLC, Broomfield, CO (US)

(72) Inventor: Christopher Newton, Westlake Village, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 24 days.

(21) Appl. No.: 15/727,765

(22) Filed: Oct. 9, 2017

(65) Prior Publication Data

US 2019/0109899 A1 Apr. 11, 2019

(51) Int. Cl.
*G06F 15/173* (2006.01)
*H04L 29/08* (2006.01)
*H04L 29/12* (2006.01)

(52) U.S. Cl.
CPC ...... *H04L 67/1023* (2013.01); *H04L 61/1535* (2013.01); *H04L 67/148* (2013.01); *H04L 67/2842* (2013.01); *H04L 61/1511* (2013.01); *H04L 67/1008* (2013.01); *H04L 67/1014* (2013.01)

(58) Field of Classification Search
CPC ..... H04L 61/1511; H04L 61/15; H04L 67/18; H04L 61/2007
USPC .......................................................... 709/224
See application file for complete search history.

(56) References Cited

U.S. PATENT DOCUMENTS

| | | | |
|---|---|---|---|
| 7,089,281 B1 * | 8/2006 | Kazemi ................. | G06F 3/0613 709/203 |
| 8,291,046 B2 * | 10/2012 | Farber ..................... | G06F 9/505 709/219 |
| 2002/0049840 A1 | 4/2002 | Squire et al. | |
| 2002/0091760 A1 | 7/2002 | Rozen | |
| 2003/0099237 A1 * | 5/2003 | Mitra ...................... | H04L 45/00 370/393 |
| 2008/0065724 A1 | 3/2008 | Seed et al. | |
| 2010/0332595 A1 * | 12/2010 | Fullagar ........... | H04N 21/23103 709/203 |
| 2012/0089664 A1 | 4/2012 | Igelka | |

(Continued)

OTHER PUBLICATIONS

International Search Report and Written Opinion of the International Searching Authority, dated Aug. 9, 2018, Int'l Appl. No. PCT/US18/035397, Int'l Filing Date May 31, 2018, 12 pgs.

(Continued)

*Primary Examiner* — Anthony Mejia
*Assistant Examiner* — Adam A Cooney

(57) ABSTRACT

A computer-implemented method in a content delivery network (CDN), wherein the CDN delivers content on behalf of at least one content provider. The method includes: a first server: receiving a request from a client for particular content; determining at least one delivery server in the CDN; migrating the request to the at least one delivery server; and then providing the least one delivery server with first network traffic from the client. Then a second server, distinct from the first server, determines information about the least one delivery server; and then, based on the determining, provides the least one delivery server with second network traffic from the client.

25 Claims, 10 Drawing Sheets

(56) References Cited

U.S. PATENT DOCUMENTS

| | | |
|---|---|---|
| 2013/0174177 A1 | 7/2013 | Newton et al. |
| 2013/0238759 A1* | 9/2013 | Ostrowski ........... H04L 61/6013 709/219 |
| 2014/0164584 A1* | 6/2014 | Joe ...................... H04L 61/1511 709/223 |
| 2014/0172970 A1* | 6/2014 | Newton .............. H04L 41/0869 709/204 |
| 2014/0344331 A1 | 11/2014 | Johns et al. |
| 2016/0119279 A1* | 4/2016 | Maslak ............... H04L 61/1511 709/223 |
| 2017/0244667 A1 | 8/2017 | Maslak |
| 2018/0139642 A1* | 5/2018 | Yoshida ................ H04W 88/18 |

OTHER PUBLICATIONS

International Preliminary Report on Patentability, dated Apr. 23, 2020, Int'l Appl. No. PCT/US18/035397, Int'l Filing Date May 31, 2018, 11 pgs.

* cited by examiner

| REQUEST INFO. FOR IPN/PNN | | |
|---|---|---|
| ID OF DELIVERY SERVER (E.G., IP ADDRESS) | URL | MISC. |

CROSS-CLUSTER DIRECT SERVER RETURN WITH ANYCAST RENDEZVOUS IN A CONTENT DELIVERY NETWORK (CDN)

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to content delivery and content delivery networks. More specifically, this invention relates to direct server return with anycast rendezvous in content delivery networks.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary

As used herein, unless used otherwise, the following terms or abbreviations have the following meanings:

AS means autonomous system;
BGP means border gateway protocol;
CD means content delivery;
CDN means content delivery network;
DNS means domain name system;
DSR means direct server return;
HTTP means Hyper Text Transfer Protocol;
HTML means Hypertext Markup Language;
HTTPS means HTTP Secure;
IP means Internet Protocol;
IPv4 means Internet Protocol Version 4;
IPv6 means Internet Protocol Version 6;
IP address means an address used in the Internet Protocol, including both IPv4 and IPv6, to identify electronic devices such as servers and the like;
OSI model refers to the Open Systems Interconnection model;
SSL means Secure Sockets Layer;
URI means Uniform Resource Identifier; and
URL means Uniform Resource Locator.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Description

A content delivery network (CDN) distributes content (e.g., resources) efficiently to clients on behalf of one or more content providers, preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

Figure 1:
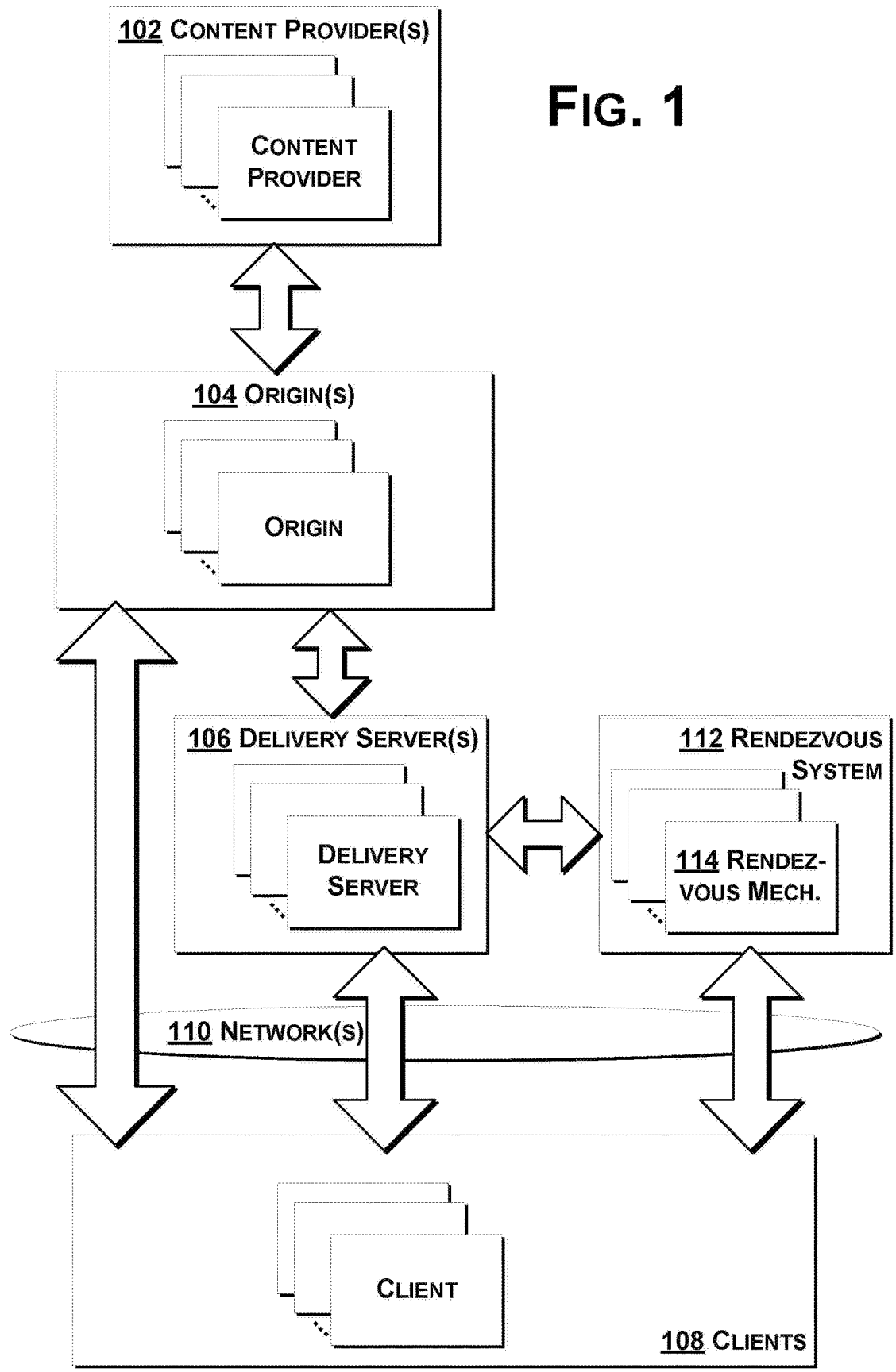
FIG. 1 depicts aspects of a content delivery network (CDN) according to exemplary embodiments hereof.

FIG. 1 shows aspects of an exemplary CDN in which one or more content providers 102 provide content via one or more origin sources 104 and delivery services (servers) 106 to clients 108 via one or more networks 110. The delivery services (servers) 106 may form a delivery network from which clients 108 may obtain content. The delivery services 106 may be logically and/or physically organized hierarchically and may include edge caches. The delivery services 106 may be logically and/or physically organized as clusters and super-clusters, as described below.

As should be appreciated, components of a CDN (e.g., delivery servers or the like) may use the CDN to deliver content to other CDN components. Thus a CDN component may itself be a client of the CDN. For example, the CDN may use its own infrastructure to deliver CDN content (e.g., CDN control and configuration information) to CDN components.

Client requests (e.g., for content) may be associated with delivery server(s) 106 by a rendezvous system 112 comprising rendezvous mechanism(s) 114, possibly in the form of one or more rendezvous networks. The rendezvous mechanism(s) 114 may be implemented, at least in part, using or as part of a DNS system, and the association of a particular client request (e.g., for content) with one or more delivery servers may be done as part of DNS processing associated with that particular client request (e.g., of a domain name associated with the particular client request).

Typically, multiple delivery servers 106 in the CDN can process or handle any particular client request for content (e.g., for one or more resources). Preferably the rendezvous system 112 associates a particular client request with one or more "best" or "optimal" (or "least worst") delivery servers 106 to deal with that particular request. The "best" or "optimal" delivery server(s) 106 may be one(s) that is (are) close to the client (by some measure of network cost) and that is (are) not overloaded. Preferably the chosen delivery server(s) 106 (i.e., the delivery server(s) chosen by the rendezvous system 112 for a client request) can deliver the requested content to the client or can direct the client, somehow and in some manner, to somewhere where the client can try to obtain the requested content. A chosen delivery server 106 need not have the requested content at the time the request is made, even if that chosen delivery server 106 eventually serves the requested content to the requesting client.

When a client 108 makes a request for content, the client may be referred to as the requesting client, and the delivery server 106 that the rendezvous system 112 associates with that client request (and that the client first contacts to make the request) may be referred to as the "contact" server or just the contact.

Exemplary CDNs are described in U.S. Pat. Nos. 8,060,613 and 8,925,930, the entire contents of both of which have been fully incorporated herein by reference for all purposes.

Clusters and Clustering

As designated intermediaries for given origin service, a CDN generally provides a redundant set of service endpoints running on distinct hardware in different locations. These distinctly addressed but functionally equivalent service endpoints provide options to the rendezvous system 112. Each distinct endpoint is preferably, but not necessarily, uniquely addressable within the system, preferably using an addressing scheme that may be used to establish a connection with the endpoint. The address(es) of an endpoint may be real or virtual. In some implementations, e.g., where service endpoints (preferably functionally equivalent service endpoints) are bound to the same cluster and share a virtual address, the virtual address may be used.

In the case of an IP-based system, each distinct endpoint may be defined by at least one unique IP address and port number combination. In an IP-based system where service endpoints are logically bound to the same cluster and share an IP address, each distinct endpoint may be defined by at least one unique combination of the IP address and port number. In some cases, service endpoints that are logically bound to the same cluster may share a so-called VIP (virtual IP address), in which cases each distinct endpoint may be defined by at least one unique combination of the VIP and a port number. In the latter case, each distinct endpoint may be bound to exactly one physical cluster in the CDN.

It should be appreciated that not all service types will require or have multi-agent logical clusters. In such cases, the endpoint may be defined in terms of a real address rather than a virtual address (e.g., an IP address rather than a VIP). A virtual address may, in some cases, correspond to or be a physical address. For example, a VIP may be (or correspond to) a physical address (e.g., for a single machine cluster).

The term VIP is used in this description as an example of a virtual address (for an IP-based system). In general any kind of virtual addressing scheme may be used and is contemplated herein. Unless specifically stated otherwise, the term VIP is intended as an example of a virtual address, and the system is not limited to or by IP-based systems or systems with IP addresses and/or VIPs.

It should be appreciated that, as used herein, e.g., to describe endpoints in a cluster, the term "functionally equivalent" does not require identical service endpoints. For example, two caching endpoint services may have different capabilities yet may be considered to be functionally equivalent.

Figure 2A:
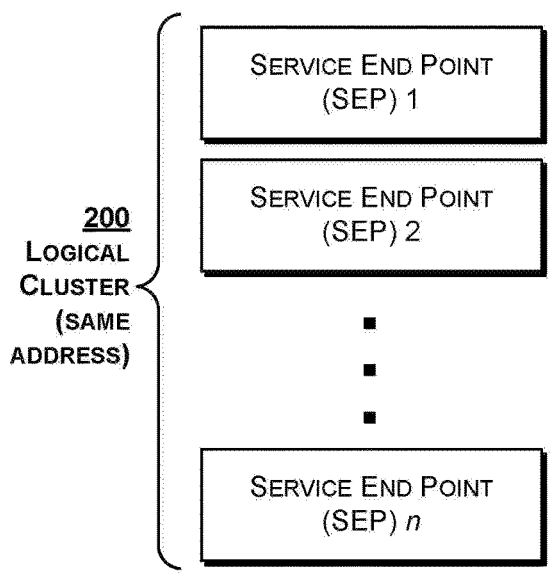
FIGS. 2A, 2B, and 3 depict aspects of clusters of service endpoints and clustering in an exemplary CDN in accordance with exemplary embodiments hereof.

A shown, e.g., in FIG. 2A, service endpoints SEP 1, SEP 2 . . . SEP n are logically bound to the same cluster 200 and share an address. When a logical cluster is within a physical cluster (e.g., when the services are on machines behind a switch), the shared address may be a virtual address (e.g., a VIP).

Figure 2B:
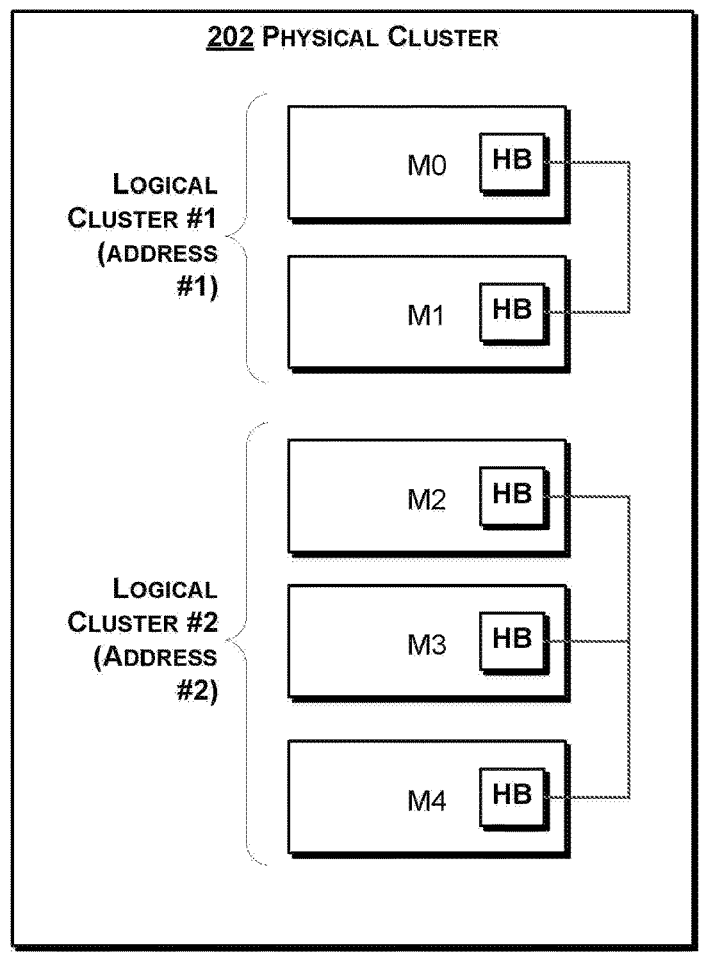

A physical cluster of service endpoints may have one or more logical clusters of service endpoints. For example, as shown in FIG. 2B, a physical cluster 202 includes two logical clusters (Logical Cluster 1 and Logical Cluster 2). Logical Cluster 1 consists of two machines (M0, M1), and Logical Cluster 2 consists of three machines (M2, M3, M4). The machines in each logical cluster may share a heartbeat signal (HB) with other machines in the same logical cluster. In this example, the first logical cluster may be addressable by a first unique virtual address (address #1, e.g., a first VIP/port combination), whereas the second logical cluster may be addressable by a second unique virtual address (address #2, e.g., a second VIP/port combination).

In a typical case, a machine may only be part of a single logical cluster; although it should be appreciated that this is not a requirement.

The machines that share a heartbeat signal may be said to be on a heartbeat ring. In the example cluster shown in FIG. 2B, machines M0 and M1 are on the same heartbeat ring, and machines M2, M3, and M4 are on the same heartbeat ring.

When a service endpoint is bound to a cluster, it means that a bank of equivalent services are running on all the machines in the cluster and listening for service requests addressed to that cluster endpoint address. Preferably a local mechanism (e.g., a load-balancing mechanism) ensures that exactly one service instance (e.g., machine) in the cluster will respond to each unique service request. This may be accomplished, e.g., by consistently hashing attributes of each request to exactly one of the available machines (and of course it is impossible to have more than one service instance listening per machine on the same endpoint). Each service instance running on machines in the cluster can be listening to any number of other endpoint addresses, each of which will have corresponding service instances running on all other machines in the cluster. Those of ordinary skill in the art will realize and understand, upon reading this description, that various mechanisms may be used to allocate/distribute service requests to service instances in a cluster. It should be appreciated that not all types of services need use the same allocation/distribution mechanisms, and that not all clusters of the same kind of service need use the same allocation/distribution mechanisms.

In some preferred implementations, each machine is installed in a physical cluster of machines behind a single shared switch. One physical cluster may be divided up into multiple logical clusters, where each logical cluster consists of those machines on the same physical cluster that are part of the same HB ring. That is, each machine runs an HB process with knowledge of the other machines in the same logical cluster, monitoring all virtual addresses (e.g., VIPs) and updating the local firewall and NIC (network interface card/controller) configurations in order to implement local load balancing across the cluster.

U.S. Pat. No. 8,015,298 titled "Load-Balancing Cluster," (the entire contents of which are fully incorporated herein by reference for all purposes) describes various approaches to ensure that exactly one service instance in a cluster will respond to each unique service request. In a first allocation approach, service endpoints on the same HB ring select from among themselves to process service requests. In a second allocation approach, also for service endpoints on the same HB ring, having selected a service endpoint from among themselves to process service requests, the selected service endpoint may select another service endpoint (preferably from service endpoints on the same HB ring) to actually process the service request. This handoff may be made based on, e.g., the type of request or actual content requested.

Since, in some cases, each machine may be considered to be a peer of all other machines in the cluster, there is no need for any other active entity specific to the cluster.

A subcluster is a group of one or more (preferably homogenous) machines sharing an internal, local area network (LAN) address space, possibly load-balanced, each running a group of one or more collaborating service instances. To external clients, i.e., those not connected to the internal LAN of the subcluster, the collection of service instances is addressed as a single service image, meaning that individual externally visible physical addresses can be used to communicate with all machines in the subcluster, though usually one at a time.

Service instances within the subcluster's internal LAN address space can preferably address each other with internal or external LAN addresses, and may also have the ability to transfer connections from one machine to another in the midst of a single session with an external client, without the knowledge or participation of the client.

A supercluster is a group of one or more (preferably homogenous) subclusters, each consisting of a group of one or more collaborating but distinctly addressed service images. Different service images in the same supercluster may or may not share a common internal LAN (although it should be appreciated that they still have to be able to communicate, directly or indirectly, with each other over some network). Those connected to the same internal LAN may use internal LAN addresses or external LAN addresses, whereas others must use external network addresses to communicate with machines in other subclusters.

Clusters may be interconnected in arbitrary topologies to form subnetworks. The set of subnetworks a service participates in, and the topology of those networks, may be dynamic, constrained by dynamically changing control policies based on dynamically changing information collected from the network itself, and measured by the set of currently active communication links between services.

Figure 3:
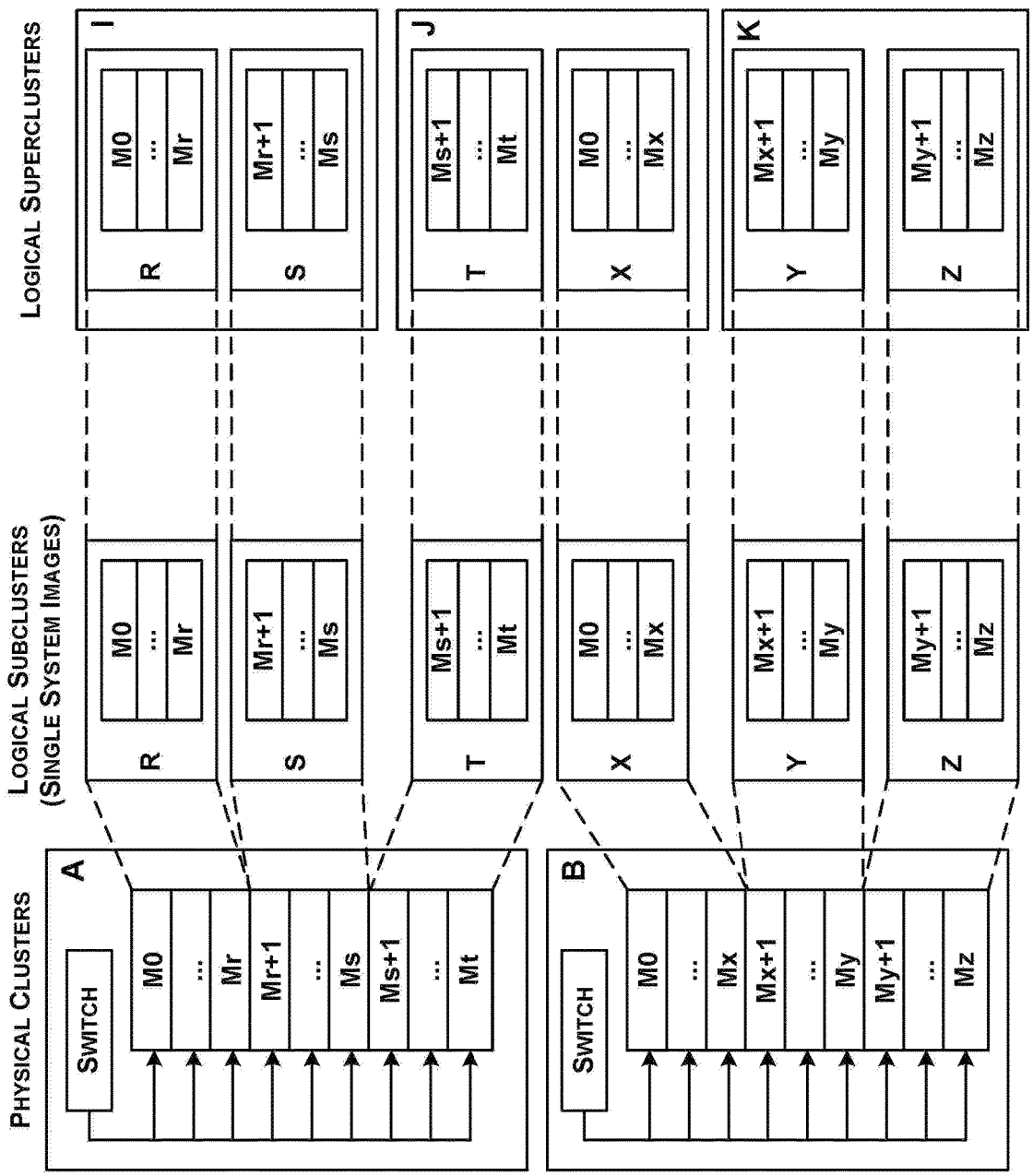

An example showing the distinction between physical clusters, logical subclusters, and logical superclusters is shown in FIG. 3. In this example, the machines of two physical clusters A and B are subdivided into groups forming logical subclusters R, S, and T (from the machines of physical cluster A) and logical subclusters X, Y, and Z (from the machines of physical cluster B). These subclusters are then logically recombined to form logical superclusters I (from subclusters R and S), J (from subclusters T and X), and K (from subclusters Y and Z). The number of machines that may be combined into one subcluster is limited by the number of machines in a physical cluster, but theoretically any number of logical subclusters may be grouped into one supercluster that may span multiple physical clusters or be contained within one.

Clustering Assumptions

For some preferred implementations, a two-level cluster architecture is assumed, where machines behind a common switch are grouped into logical sub-clusters, and sub-clusters (whether behind the same switch or on different racks/switches) are grouped into super-clusters. In some preferred implementations, using, e.g., the systems described in U.S. Pat. No. 8,015,298 titled "Load-Balancing Cluster," all machines in a logical sub-cluster are homogeneous with respect to the virtual address (e.g., VIPs) they serve (each machine serves the same virtual addresses—VIPs—as all other machines in the sub-cluster), and machines in distinct logical clusters will necessarily serve distinct (non-overlapping) sets of virtual addresses—VIPs.

A single switch may govern multiple sub-clusters and these sub-clusters need not be in the same super-cluster. It is logically possible to have any number of machines in one sub-cluster, and any number of sub-clusters in a super-cluster, though those of ordinary skill in the art will realize and understand that physical and practical realities will dictate otherwise.

Other features described in U.S. Pat. No. 8,015,298 could be made available as an optional feature of sub-clusters, enabling the transfer of connections from one machine to another in the same sub-cluster.

U.S. Pat. No. 8,015,298 describes various approaches to ensure that exactly one service instance in a cluster will respond to each unique service request. These may be referred to as the first allocation approach and the second allocation approach. In the first allocation approach, service endpoints on the same HB ring select from among themselves to process service requests. In the second allocation approach, also for service endpoints on the same HB ring, having selected a service endpoint from among themselves to process service requests, the selected service endpoint may select another service endpoint (preferably from service endpoints on the same HB ring) to actually process the service request. This handoff may be made based on, e.g., the type of request or actual content requested.

It is assumed here that for some implementations an additional level of heartbeat-like functionality (referred to herein as super-HB) exists at the level of virtual addresses (e.g., VIPs) in a super-cluster, detecting virtual addresses that are down and configuring them on machines that are up. This super-HB allows the system to avoid relying solely on DNS-based rendezvous for fault-tolerance and to deal with the DNS-TTL phenomenon that would cause clients with stale IP addresses to continue to contact VIPs that are known to be down. It should be appreciated that a super-HB system may have to interact with the underlying network routing mechanism (simply bringing a VIP "up" does not mean that requests will be routed to it properly). For example, if a sub-cluster is to take over another sub-cluster's VIP because the second sub-cluster is completely down or has lost enough capacity that the system will consider it to be down, the routing infrastructure is preferably informed that the VIP has moved to a different switch. As noted earlier, while this discussion is made with reference to VIPs, it should be appreciated that the system is not limited to an IP-based scheme, and any type of addressing and/or virtual addressing may be used.

Heartbeat(s) provide a way for machines (or service endpoints) in the same cluster (logical and/or physical and/or super) to know the state of other machines (or service endpoints) in the cluster, and heartbeat(s) provide information to the various allocation techniques. A heartbeat and super-heartbeat may be implemented, e.g., using the reducer/collector systems such as described in U.S. Pat. No. 8,925,930. However, those of ordinary skill in the art will realize and understand, upon reading this description, that a local heartbeat in a physical cluster is preferably implemented locally and with a fine granularity. A super-heartbeat may not have (or need) the granularity of a local heartbeat.

This leads to two extreme approaches to configuring a super-cluster, one relying on the first allocation approach described above (with reference to U.S. Pat. No. 8,015,298), with optional super-HB, the other with super-HB and optional first allocation approach:

A super-cluster containing N>1 sub-clusters with >1 machines
　First allocation approach required, second allocation approach optional. A super-HB is unnecessary.
A super-cluster containing N>1 sub-clusters with 1 machine each
　First allocation approach not required, second allocation approach not supported. This requires a super-HB.

Depending on the overhead of the first allocation approach and the fail-over properties of virtual address (e.g., VIP) reconfiguration and rendezvous, it may be advantageous to actually configure a super-cluster somewhere in between these two extremes. On the one hand, the first allocation approach system described in U.S. Pat. No. 8,015,298 provides the most responsive failover at the cost of higher communication overhead. This overhead determines an effective maximum number of machines and VIPs in a single logical sub-cluster based on the limitations of the heartbeat protocol. The First allocation approach mechanisms described in U.S. Pat. No. 8,015,298 also imposes additional overhead beyond that of heartbeat due to the need to broadcast and filter request traffic. On the other hand, a VIP-level failover mechanism that spans the super-cluster would impose similar heartbeat overhead but would not require any request traffic broadcasting or filtering.

Detection of down VIPs in the cluster may potentially be handled without a heartbeat, using a reduction of log events received outside the cluster. A feedback control mechanism could detect inactive VIPs and reallocate them across the cluster by causing new VIP configurations to be generated as local control resources.

Request-Response Processing

As described, a particular client request for content (e.g., for a resource) uses the rendezvous system 112 to determine an appropriate delivery server 106 to handle the request. That appropriate delivery server 106 effectively becomes the contact server for that request.

U.S. patent application Ser. No. 15/364,036, filed Nov. 29, 2016, describes cross-cluster direct server return in a content delivery network (CDN). As described in patent application Ser. No. 15/364,036, a so-called initial contact (IC) server may serve requested content or may transfer a request to a "better" server using direct server return (DSR). The entire contents of patent application Ser. No. 15/364,036 are fully incorporated herein by reference for all purposes.

Figure 4:
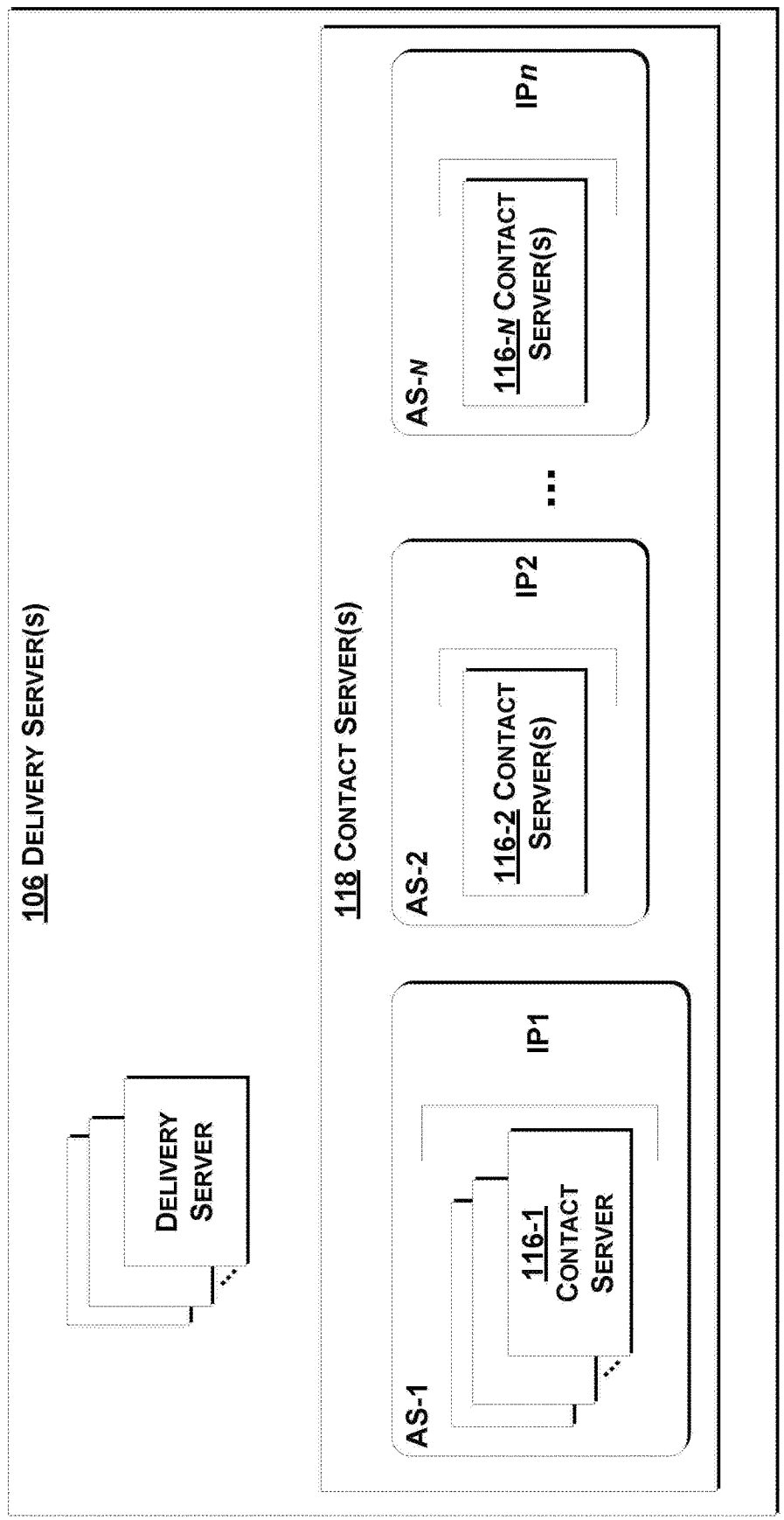
FIGS. 4, 5A-5C, 6, and 7 depict aspects of Direct Server Return in a CDN according to exemplary embodiments hereof.

With reference now to FIG. 4, in embodiments hereof, certain delivery servers 106 may act primarily (or even solely) as contact servers 116. The contact servers 116 of exemplary embodiments hereof may thus act only as contacts and do not also serve content. Thus, when a contact server 116 is contacted by a client and receives a client request, the contact server selects another delivery server 106 to handle the request. The request may then be handled by the "better" server using direct server return (DSR), e.g., as described in U.S. application Ser. No. 15/364,036.

The contact servers 116 may form a network 118 of contact servers. Although shown in FIG. 4 as a logical subset of the delivery servers 106, since, in preferred embodiments, the contact servers 116 do not also serve content, they may be considered a separate set of servers. However, as noted, when DSR is used to serve a client, the client is unaware that that contact server 116 is not actually serving the content to the client. As far as the client is concerned, the contact server 116 is a delivery server.

In preferred embodiments hereof, one or more groups of contact servers 116 within the same autonomous system (AS) have the same IP address. E.g., as shown in FIG. 4, the contact servers 116-1, . . . in autonomous system AS-1 have the same IP address, namely IP1, the contact servers 116-2, . . . in autonomous system AS-2 have the same IP address, namely IP2, and so on. There may be multiple groups of contact servers in a particular AS. Note that not all contact servers in an AS need have the same IP address, and contact servers in other autonomous systems may have the same IP address.

Figure 5A:
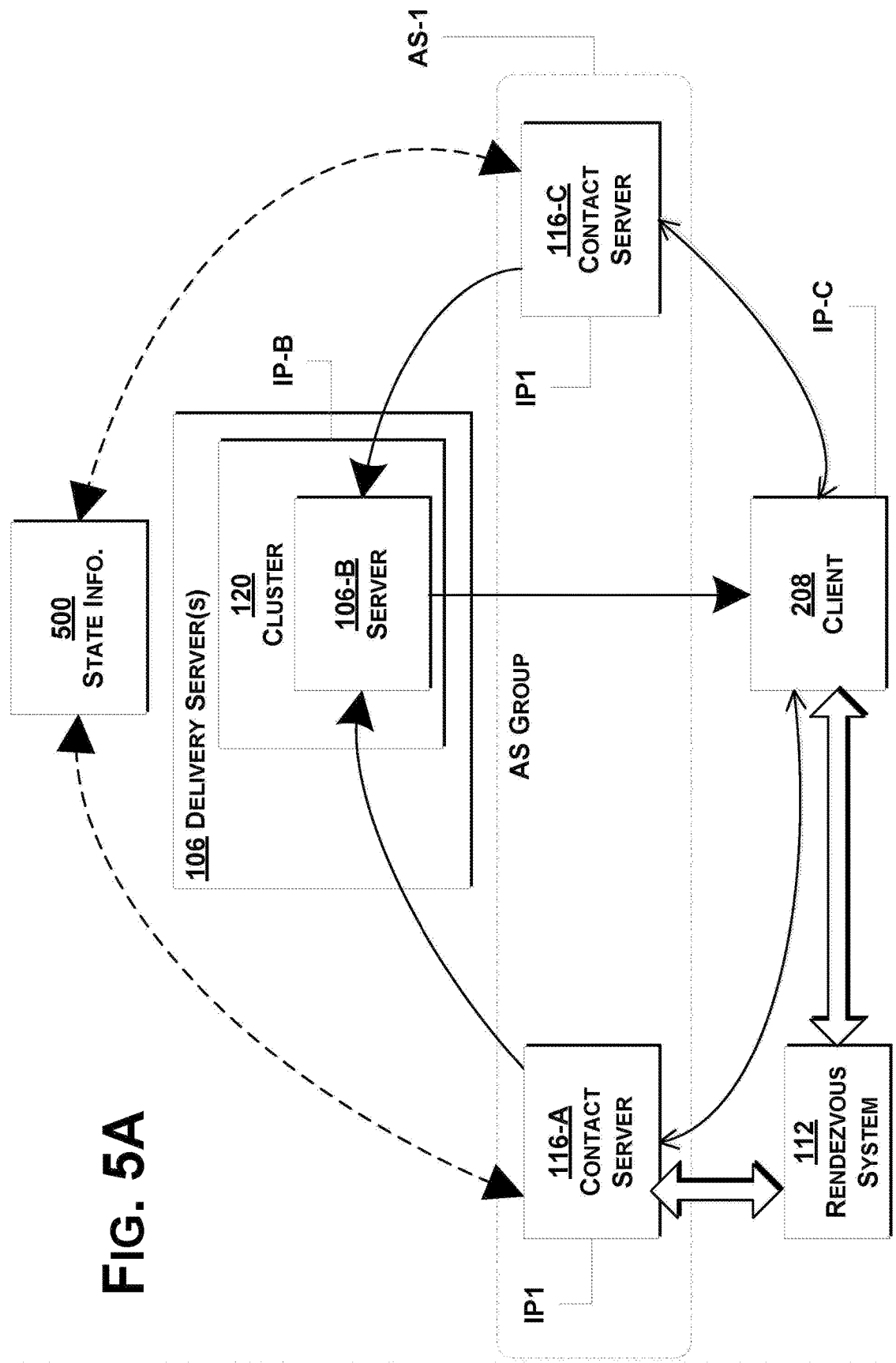

With reference to FIG. 5A, according to exemplary embodiments hereof, a client's request for content is directed, by the rendezvous system 112, to a first or initial contact server to handle the request. The client 208 is provided with an IP address (e.g., IP1) for the initial contact server, e.g., by the rendezvous system 112. Recall that a group of multiple contact servers in the same AS may have the same IP address. For the purposes of this explanation, assume that contact servers 116-A and 116-C are in the same AS and have the same IP address (IP1). Using anycast, the client 208 initially connects to one of the contact servers 116 with the IP address IP1. For the sake of this description, and without loss of generality, assume that the client initially connects to contact server 116-A. The contact server 116-A to which the client 208 initially connects then selects a delivery server (e.g., 106-B) from the delivery servers 106, and then uses direct server return (DSR) (e.g., as described in U.S. application Ser. No. 15/364,036) to process the client request.

Figures 5B, 5C:
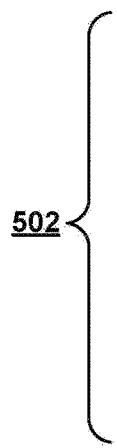

The contact servers, including initial contact server 116-A, may use state information 500 to maintain and/or lookup information about the connection between the client 208 and the request being handled by the contact server 116-A. For example, the state information 500 may include, e.g., a reference table 502 (FIG. 5B) that maps client IP addresses and port numbers to corresponding request information. As shown in FIG. 5C, the request information may include the IP address of the delivery server that is serving the client, the requested URL (or some identification of or information about the requested resource), and other miscellaneous information (e.g., connection information and the like). Effectively, the first contact server registers the association between the client and the delivery server that is actually serving the client.

The state information is preferably accessible to other contact servers, at least in the same AS (or AS group) as the contact server 116-A. State information 500 may be provided using, e.g., a collector and/or reducer network of the CDN (e.g., as described in U.S. Pat. Nos. 8,060,613 and 8,925,930, the entire contents of both of which have been fully incorporated herein by reference for all purposes).

The connection between the client 208 and the contact server 116-A (as opposed to another contact server with the same IP address and in the same autonomous system (AS) as contact server 116-A) is made by or based on BGP tables. In other words, although multiple contact servers in the same AS (or AS group) have the same IP address, only one such contact server will be used, based, e.g., on network load, traffic, BGP tables, etc. As such, if network conditions change during the connection (as reflected by changes to the BGP tables), then the client 208 may be directed, during the processing of the request, to a different contact server with the same IP address (e.g., to contact server 116-C). The second (or subsequent) contact server 116-C needs to continue processing the request with the client 208 and the delivery server 106-B where the first (or previous) contact server 116-A/delivery server 106-B left off.

In order to continue processing the client request, the second (or subsequent) contact server 116-C needs to determine which delivery server 106 is serving the client 208. To do this, the contact server 116-C may, e.g., query the reference table 502 in the state information 500 to determine the identity of server 106-B. The identity may be recorded in the state information 500 as any unique identifier. In some embodiments, the IP address (IRB) of server 106-B may be used to uniquely identify the server in the state information. Recall that the reference table 502 maps the client's IP address (and port number), inter alia, to the address of the delivery server 106 that is handling the client request. The contact server 116-C may use the IP address (IRC) of the client 208 to lookup information in the table 502 in the state information 500.

The client request may then be processed using DSR with contact server 116-C, delivery server 106-B, and client 208. Since the contact servers 116-A and 116-B have the same IP address (IP1), the client is unaware of any change. However, instead of the DSR having contact server 116-A act as a pass-through proxy, that role is taken by contact server 116-C. Similarly, the delivery server 106-B may be unaware of the change in contact servers.

When the request processing is complete, the state information 500 should be updated to remove the information about the request. This can be done by having the entry for the request removed by the last contact server 116 handling the request. Effectively, the last contact server handling the request un-registers the association between the client and the delivery server.

The IP address IP-B may correspond to a multi-machine cluster, in which case, the DSR migrated request (from contact server) may be handled by server 106-B or by any machine in cluster 120, in accordance with that cluster's request processing policies and protocols. The network address that the contact server uses for server 106-B may be a VIP for the cluster 120 or a VIP for server 106-B or an IP address of server 106-B. When the address is a VIP for the cluster 120, then the cluster may choose delivery server 106 to handle the request. In the case of the IP-B being a cluster, elements of the request may be used to determine which server within that cluster will process the request. Note, however, that such determining needs to use the elements of the actual client request (rather than, e.g., the LAN address of the IC machine(s)).

After the initial contact server hands off the request to server 106-B, using direct server return (DSR) the contact server essentially acts as a router for that request. While the handoff (from contact server to delivery server 106-B) is transparent to the client 208, in TCP/IP communication with the delivery server 106-B, the client must get the same IP address as the initial contact server (IP1). Therefore the delivery server 106-B must spoof the IP address of the contact server on a per connection basis (unless the delivery server 106-B has the same public IP address as the contact server, e.g., in an anycast system).

The Open Systems Interconnection model (OSI model) is a conceptual model that characterizes and standardizes the communication functions of a telecommunication or computing system without regard to their underlying internal structure and technology. The OSI model partitions a communication system into abstraction layers. The original version of the model defined seven layers, including:

- Layer 3 (Network layer—packets) Structuring and managing a multi-node network, including addressing, routing and traffic control (e.g., AppleTalk, ICMP, IPsec, IPv4, IPv6)
- Layer 4 (Transport layer) Segments (e.g. TCP)/Datagrams (e.g., UDP)
- Layer 5 (Session layer—Data): Managing communication sessions, i.e. continuous exchange of information in the form of multiple back-and-forth transmissions between two nodes (e.g., HTTP, HTTPS)

After the initial client request to the contact server 116-A (at Layer 5, the HTTP level), the contact server becomes a Layer 3/4 pass-through router in only one direction (from the client to the contact server to the delivery server) for that client request. Thus the contact server changes from a Layer 5 session/application layer (e.g. HTTP) server and becomes a Layer 3/4 router. The initial contact server is thereby converted into a routing device for that particular client connection. In the case of an HTTPS request/connection, the contact server/delivery server may not be able to communicate sufficient state to have the SSL handshake performed by the contact server (so that the request could be inspected by the contact server) and then have the delivery server continue the encryption of the responses. In such cases, the contact server may perform a delivery server selection based on just load and/or client location and then forward the connection immediately that the connection has been established. That is, in such cases, the contact server may function as a Layer 3/4 pass-through immediately on connection establishment.

The client 208 establishes a connection (e.g., a TCP/IP connection) with the contact server 116-A and makes a request (e.g., an HTTP request) to the contact server 116-A. The contact server 116-A migrates the TCP connection to the delivery server 106-B. The contact server 116-A freezes the connection with the client and determines the required TCP state information (e.g., sequence numbers, etc.), and conveys that information to the delivery server 106-B over some protocol (e.g., TCP), preferably over a side-channel, possibly using tunneling. The delivery server 106-B then constructs the socket and starts sending the packets back (to the client 208).

Every time the client 208 sends an ACK (for the pieces of the TCP packet stream that it receives from the delivery server 106-B), that ACK is still going to come back to the contact server 116-A. The contact server 116-A then provides those ACKs to the delivery server 106-B.

Thus, contact server 116-A starts at layer 5 (HTTP) with its connections with the client. Once the handoff is made to delivery server 106-B, contact server 116-A effectively becomes a layer 3/4 (router) and forwards layer 3/4 information (e.g., ACKs) from the client to the delivery server 106-B. The contact server 116-A will still receive the layer 3/4 and layer 5 information (e.g., HTTP) from the client 208, but this information is forwarded to the delivery server 106-B. Note that the contact server 116-A may examine layer 3/4 and layer 5 information, e.g., for tracking purposes or the like, but is not required to do so.

Figure 6:
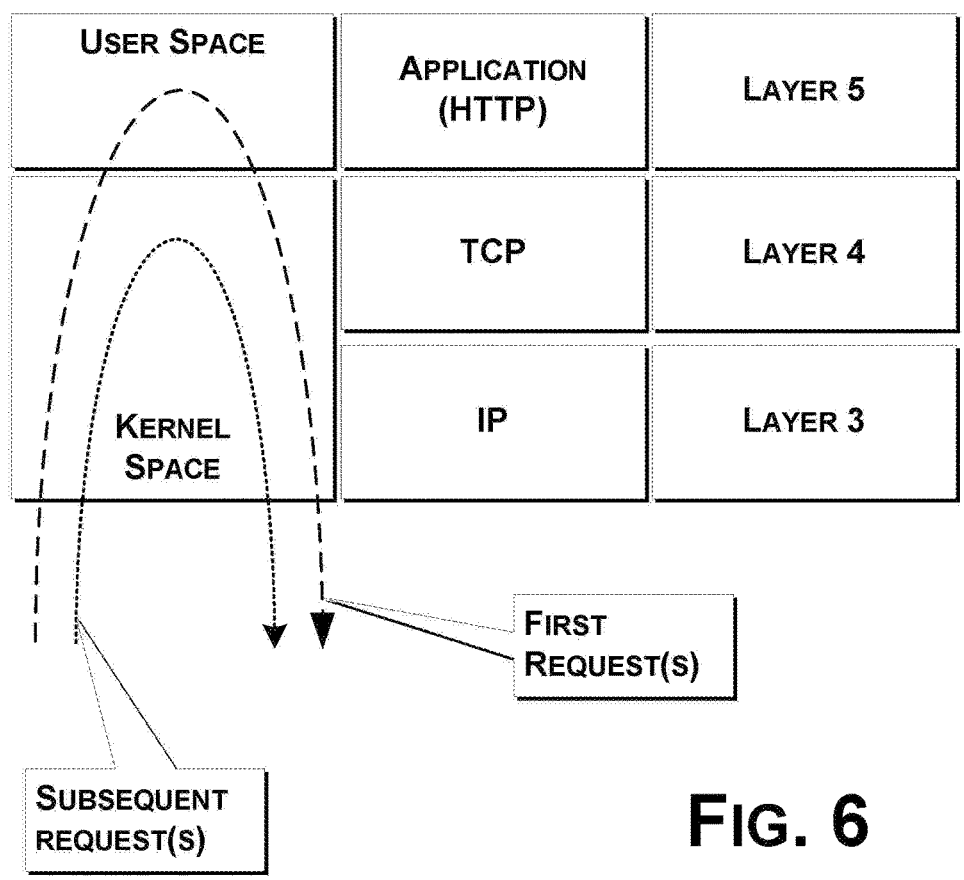

As shown in FIG. 6, the first request(s) to the first contact server from the client are handled by the first contact server at the application (HTTP) layer, whereas after the handoff to delivery server, subsequent requests are preferably handled by the first contact server (and subsequent contact servers) at the TCP layer.

As will be appreciated, the use of an initial contact server (IC) and then DSR with a delivery server may introduce delays compared to a hypothetical direct TCP/IP connection between delivery server and the client. There may, e.g., be a delay added by the extra time T1 from the client to contact server and T2 from contact server to delivery server. The DSR migration to delivery server may potentially impact the performance of the overall throughput of the session because the path (for the TCP round trip time) is potentially being lengthened. There is also a delay in serving the initial response from delivery server as opposed to serving the response directly from contact server. The handoff has potential for making some aspects of the response to the client worse than if the response had been served directly from contact server. These potential delays, etc. can be taken into account when selecting a delivery server.

Thus, once responsibility for the request has been transferred from an contact server to the delivery server 106-B, the contact server passes TCP packets from the client 208 to the delivery server 116-B. These packets are transferred at the TCP (layer 4) level, and the contact server 116 need not examine them. The delivery server 106-B, obtains the TCP packets from the client (via the contact server 116) and processes the client request. From the client's perspective it has a TCP connection with the contact server 106-A.

Preferably the chosen delivery server (or the chosen delivery server cluster) handles the request and does not, itself, pass on the request to yet another "better" server. While such processing is possible and contemplated herein, it is likely to introduce unacceptable delays.

A contact server 116 may, in some cases, be capable of serving the requested content and may sometimes serve requested content to a client. Those of ordinary skill in the art will realize and appreciate, upon reading this description, that embodiments of the system are preferably symmetric, in that the delivery server may, itself, be an initial contact for some client requests and may include the same DSR migration capabilities as contact server. Similarly, contact server may be a "better" server for some other initial contact and may have a client connection DSR migrated to it.

Picking a Delivery Server

Assuming that the contact servers do not serve content, the contact server 116 that first receives a client request must select a delivery server 106 to handle the client request. The contact server may make this determination based on information associated with the request, at least some of which may be information that was not (or may not have been) known to (or knowable by) the rendezvous system 112 at the time that contact server was selected by the rendezvous system. This information may include one or more of:

(1) the requesting client's network (IP) address,
(2) customer information (e.g., the CDN customer with which the requested content is associated, e.g., based on property information);
(3) size of the requested content;
(4) kind of the requested content;
(5) serving policy associated with the requested content (e.g., based on property information);
(6) media player need or used for the requested content;
(7) type of client's device; and
(8) load at the contact server (if contact servers serve content).

For some of the server selection approaches it is preferable to have an equivalent of the intra-cluster heartbeat process in order to know which machines are online. This may be implemented, at least in part, using the super-HB described above. As noted above, a heartbeat (e.g., a cross-cluster heartbeat) may be implemented, e.g., using the reducer/collector systems such as described in U.S. Pat. No. 8,925,930.

As noted above, the DSR migration is transparent to the client, and so the client must see the requested content coming from the same address as the contact server (which is where the client thinks it is coming from). To this end, the delivery server must spoof the IP address of the contact server on a per connection basis unless the delivery server has the same IP address as the contact server, e.g., in an anycast system in which all potential contact servers and BSs may have the same IP address.

Those of ordinary skill in the art will realize and appreciate, upon reading this description, that the contact servers and BSs should be in the same autonomous system (AS) in order for the DSR migration to function, otherwise source-filter routing may filter out packets.

In some cases, the contact servers may be dedicated appliances that do not serve content and essentially act as a second level HTTP-level rendezvous mechanism.

As explained above, after the initial contact (IC) server establishes the connection and the DSR connections with the delivery server 106-B and the client 208, subsequent contact servers 116 should use the same delivery server 106-B for any DSR sessions from the same client 208 for the same resource. As noted, subsequent contact servers 116 may uses state information 500 that the first contact server registered about client and delivery server (e.g., in table 502).

If the contact server can, itself, also delivery content, then the contact server must decide whether or not to migrate the request to a "better" delivery server. Such decisions may be made, e.g., as described in U.S. patent application Ser. No. 15/364,036, which has been fully incorporated herein by reference for all purposes.

Figure 7:
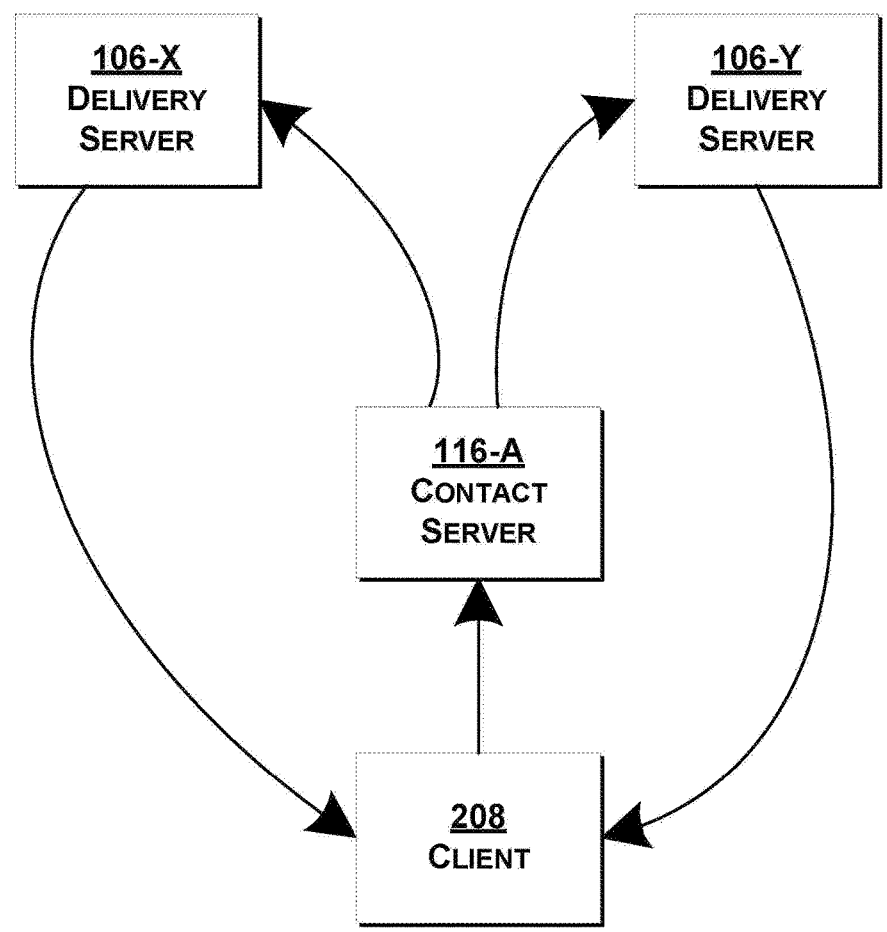

In some embodiments the contact server may choose more than one delivery server to handle the request. In such cases the contact server establishes multiple DSR connections with multiple delivery servers. For example, as shown in FIG. 7, the contact server 116-A is selected by the client 208 to handle a request. The contact server selects delivery servers 106-X and 106-Y (e.g., using the rendezvous system). The contact server 116-A then establishes two separate DSR connections with the client and each of the two delivery servers 106-X and 106-Y. Although only two delivery servers are shown in the example in FIG. 7, those of ordinary skill in the art will appreciate and understand, upon reading this description, that more than two delivery servers may be used, along with a corresponding number of DSR connections.

Further, the contact server 116-A may be a contact server that can serve content, or it may be a server that acts solely as a contact server.

This approach assumes that each selected delivery server (delivery servers 106-X and 106-Y) has identical (and possibly correct) copies of the requested content. The approach requires that the packets sent by each delivery server be identical so that the client 208 can accept and use whichever packet(s) it receives first. In this regard, in particular, the MSS (Maximum TCP segment Size) for each delivery server must be the same.

Using multiple delivery servers provides redundancy and may provide improved delivery times (over a single delivery server or fewer delivery servers). However, as should be appreciated, there are costs (including overhead) of using multiple delivery servers. Accordingly, the decision as to how many delivery servers to use may be made based on policies (e.g., quality of service guarantees, etc.).

Figure 8:
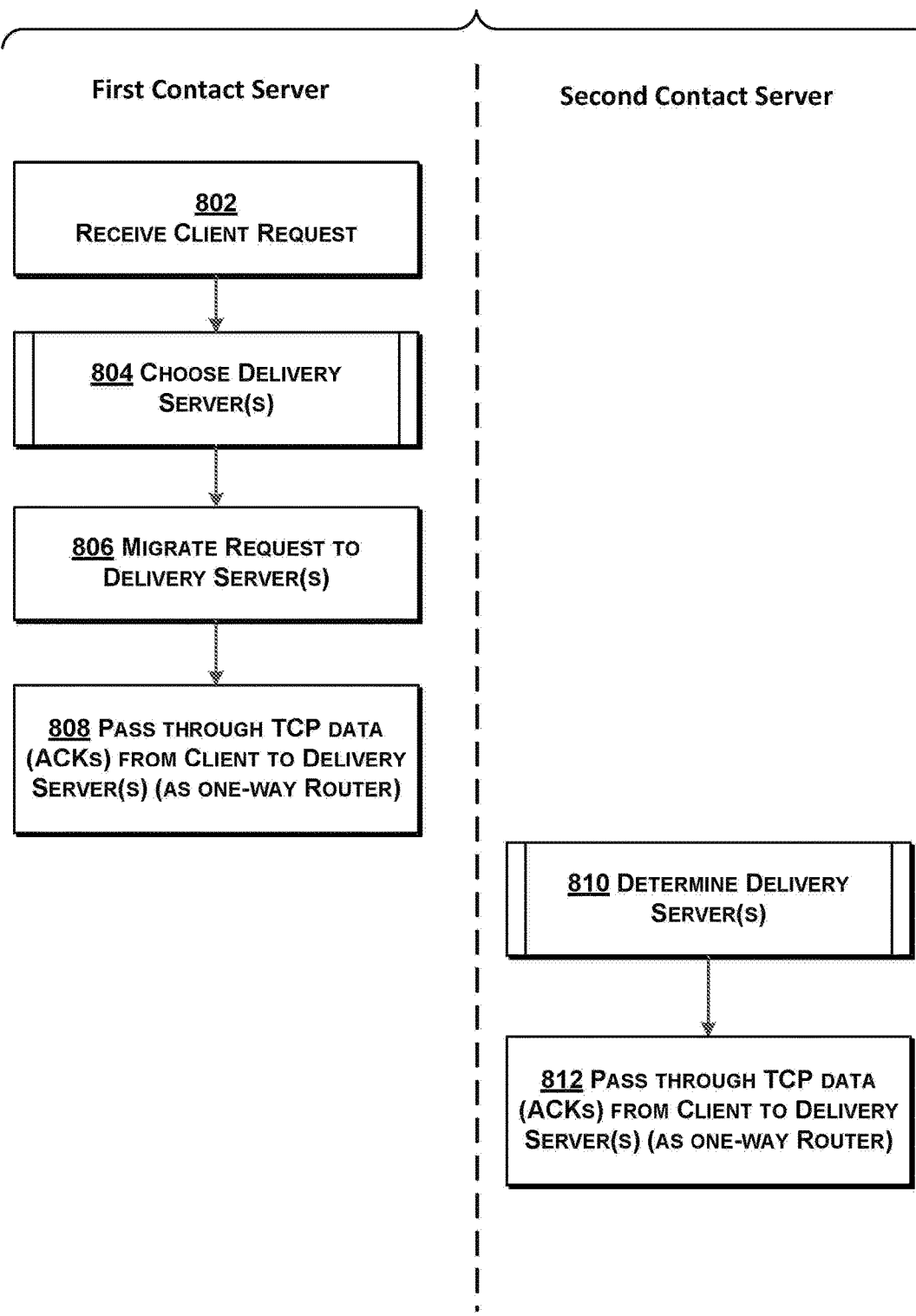
FIG. 8 is a flowchart depicting aspects of exemplary embodiments hereof.

With reference to the flowchart in FIG. 8, in exemplary embodiments hereof, a client request is received (at 802) by a first contact server (e.g., contact server 116-A in a contact server group or network 118—FIG. 4). The client request was directed to the first contact server (116-A) using an IP address (e.g., IP1) associated with that contact server and using Anycast routing mechanisms. For this embodiment, assume that the contact server does not also serve content and so must migrate the request. The first contact server (116-A) then chooses (at 804) one or more delivery servers (106) and migrates the request (at 806) to each of the selected delivery servers. As part of the request migration (at 806), the first contact server updates the state information (500 in FIG. 5A, 502 in FIG. 5B) to reflect the selected delivery server(s) 106 and other request information (e.g., a URL associated with the client request). Then, for each delivery server, (at 808) the first contact server (116-A) passes TCP data packets (ACKs) from the client to the delivery server(s).

If the Anycast routing mechanisms cause the client request to switch from the first contact server 116-A to a different contact server 116-C, then (at 810) the second contact server 116-C determines the delivery server(s) 106 (e.g. using the state/registration information 500). The second contact server 116-C then (at 812) passes TCP data packets (ACKs) from the client to the delivery server(s).

Although only one switch is shown (from contact server 116-A to the second contact server 116-C), those of ordinary skill in the art will appreciate and understand, upon reading this description that multiple contact server switches may occur.

Discussion

Anycast may be used with or for or as part of a rendezvous system to select a delivery server to handle a client request. However, an Anycast-based system can switch servers midstream, which can break long running (TCP-like) connections.

As described here, these problems with Anycast are removed or ameliorated, avoiding interrupted service.

Computing

The services, mechanisms, operations and acts shown and described above are implemented, at least in part, by software running on one or more computers of a CDN.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 9:
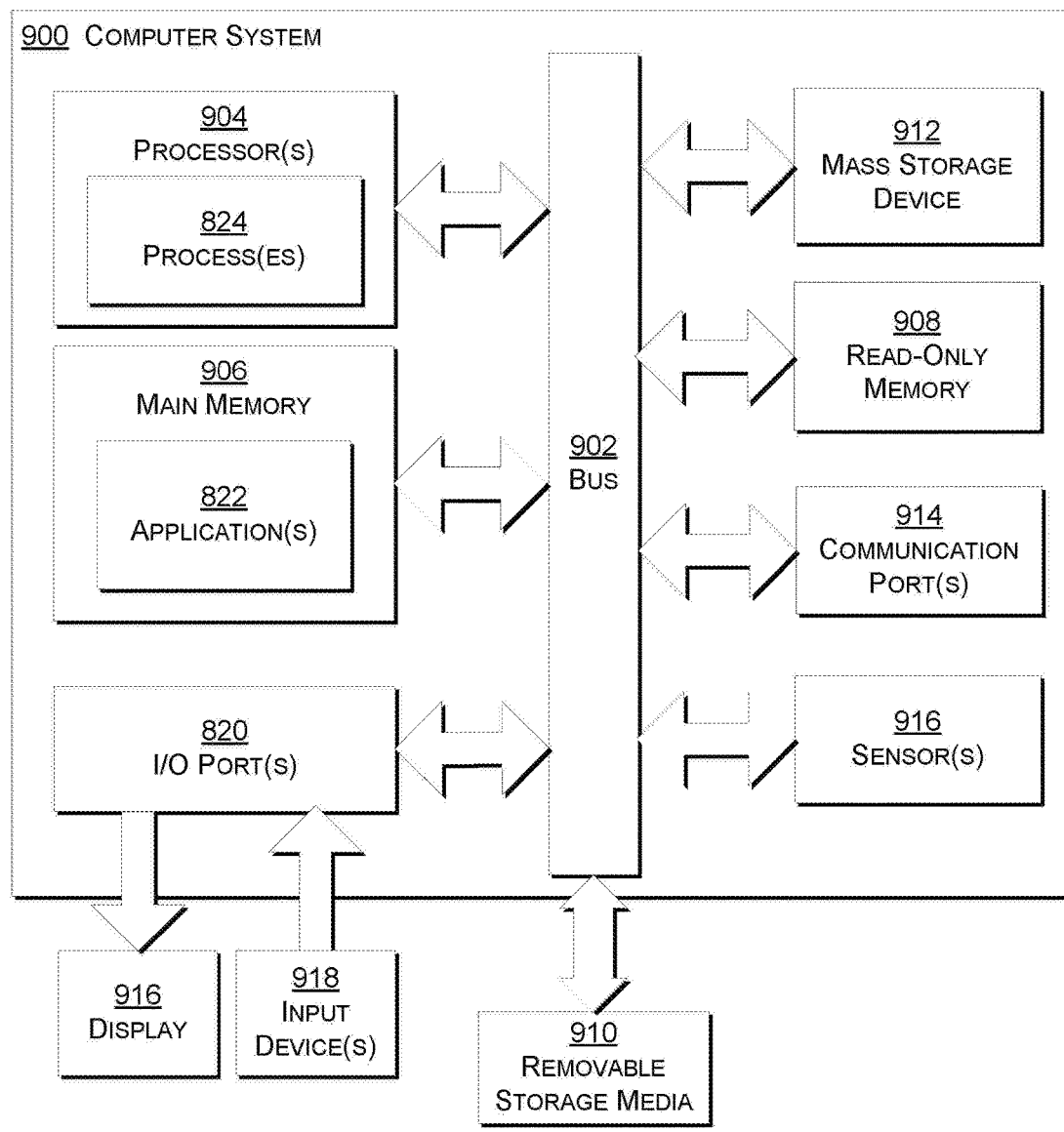
FIG. 9 depicts aspects of computing according to exemplary embodiments hereof.

FIG. 9 is a schematic diagram of a computer system 900 upon which embodiments of the present disclosure may be implemented and carried out.

According to the present example, the computer system 900 includes a bus 902 (i.e., interconnect), one or more processors 904, a main memory 906, read-only memory 908, removable storage media 910, mass storage 912, and one or more communications ports 914. Communication port 914 may be connected to one or more networks by way of which the computer system 900 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 904 can be any known processor, such as, but not limited to, an Intel® Itanium® or Itanium 2® processor(s), AMD® Opteron® or Athlon MP® processor(s), or Motorola® lines of processors, and the like. Communications port(s) 914 can be any of an RS-232 port for use with a modem based dial-up connection, a 10/100 Ethernet port, a Gigabit port using copper or fiber, or a USB port, and the like. Communications port(s) 914 may be chosen depending on a network such as a Local Area Network (LAN), a Wide Area Network (WAN), a CDN, or any network to which the computer system 900 connects. The computer system 900 may be in communication with peripheral devices (e.g., display screen 916, input device(s) 918) via Input/Output (I/O) port 920.

Main memory 906 can be Random Access Memory (RAM), or any other dynamic storage device(s) commonly known in the art. Read-only memory 908 can be any static storage device(s) such as Programmable Read-Only Memory (PROM) chips for storing static information such as instructions for processor 904. Mass storage 912 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 902 communicatively couples processor(s) 904 with the other memory, storage, and communications blocks. Bus 902 can be a PCI/PCI-X, SCSI, a Universal Serial Bus (USB) based system bus (or other) depending on the storage devices used, and the like. Removable storage media 910 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 906 is encoded with application(s) 922 that supports the functionality discussed herein (the application 922 may be an application that provides some or all of the functionality of the CD services described herein, including the client application and the optimization support mechanism 112). Application(s) 922 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 904 accesses main memory 906 via the use of bus 902 in order to launch, run, execute, interpret or otherwise perform the logic instructions of the application(s) 922. Execution of application(s) 922 produces processing functionality of the service related to the application(s). In other words, the process(es) 924 represent one or more portions of the application(s) 922 performing within or upon the processor(s) 904 in the computer system 900.

It should be noted that, in addition to the process(es) 924 that carries (carry) out operations as discussed herein, other embodiments herein include the application 922 itself (i.e., the un-executed or non-performing logic instructions and/or data). The application 922 may be stored on a computer readable medium (e.g., a repository) such as a disk or in an optical medium. According to other embodiments, the application 922 can also be stored in a memory type system such as in firmware, read only memory (ROM), or, as in this example, as executable code within the main memory 906 (e.g., within Random Access Memory or RAM). For example, application 922 may also be stored in removable storage media 910, read-only memory 908 and/or mass storage device 912.

Those skilled in the art will understand that the computer system 900 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

I claim:

1. A computer-implemented method in a content delivery network (CDN), wherein said CDN delivers content on behalf of at least one content provider, the method comprising:
   (A)(1) a first contact server receiving a request from a client for particular content;
   (A)(2) determining at least one delivery server in said CDN;
   (A)(3) said first contact server providing said at least one delivery server with first network traffic from said client, wherein said first network traffic comprises an indication of said request for particular content, and wherein said at least one delivery server is configured to spoof an address of said first contact server; and then
   (B)(1) a second contact server, distinct from the first contact server, determining information about said at least one delivery server; and then,
   (B)(2) based on said determining in (B)(1), said second contact server providing said at least one delivery server with second network traffic from said client,
   wherein said first contact server and said second contact server are not configured to serve content, and wherein said at least one delivery server serves at least some of the particular content to the client.

2. The method of claim 1, wherein the first contact server and second contact server are in the same autonomous system (AS).

3. The method of claim 2, wherein the first contact server and second contact server have the same Internet Protocol (IP) address, and wherein the address of said first contact server is the IP address.

4. The method of claim 2 wherein said first network traffic further comprises registering information about said at least one delivery server in association with said client.

5. The method of claim 4, wherein said determining information in (B)(1) uses information about said at least one delivery server in association with said client.

6. The method of claim 1 wherein said at least one delivery server consists of one delivery server.

7. The method of claim 1 wherein said request from said client in (A)(1) is at OSI layer 5, and wherein said first network traffic from said client in (A)(3) and said second network traffic from said client in (B)(2) is at OSI layers 3 or 4.

8. The method of claim 1 wherein said determining of said at least one delivery server in (A)(2) uses a rendezvous system.

9. The method of claim 8 wherein said rendezvous system comprises a domain name system (DNS).

10. The method of claim 8 wherein said at least one delivery server is determined in (A)(2) without using said rendezvous system.

11. The method of claim 1 wherein said at least one delivery server is determined in (A)(2) using one or more tables.

12. The method of claim 11 wherein said one or more tables comprise information from a rendezvous system.

13. The method of claim 11 wherein at least some of said one or more tables are on said first contact server.

14. The method of claim 11 wherein at least some of the tables are at a third device distinct from said first contact server.

15. The method of claim 1 wherein said first contact server establishes a TCP/IP connection with the client prior to receiving said request in (A)(1), and wherein said first network traffic further comprises at least some TCP/IP information.

16. The method of claim 1 wherein the request is an HTTP request and wherein the first network traffic from the client comprises acknowledgments (ACKs), and wherein said providing in (A)(3) comprises providing said at least one delivery server with said ACKs from said client.

17. The method of claim 1 wherein said first contact server was chosen by a rendezvous system to handle the request from the client.

18. The method of claim 17 wherein the determining of the at least one delivery server in (A)(2) is based, at least in part, on certain information not known to the rendezvous system when said first contact server was chosen by said rendezvous system.

19. The method of claim 18 wherein said certain information comprises information associated with said request.

20. The method of claim 19 wherein said certain information comprises one or more of:
   (i) a network address of the client;
   (ii) customer information;
   (iii) a size of the particular content;
   (iv) a kind of the particular content;
   (v) a serving policy associated with the particular content;
   (vi) a media player need or used for the particular content;
   (vii) a type of client's device;
   (viii) a popularity of the particular content; and
   (ix) an object identifier for the particular content.

21. The method of claim 1 wherein, in providing said at least one server with said first network traffic from said client in (A)(3), said first contact server acts as a router for the request, and wherein, in providing said at least one server with said second network traffic from said client in (B)(2), said second contact server acts as a router for the request.

22. The method of claim 21 wherein, in providing said at least one server with said first network traffic from said client in (A)(3), said first contact server acts as a pass-through router in only one direction for the request; and wherein, in providing said at least one server with said second network traffic from said client in (B)(2), said second contact server acts as a pass-through router in only one direction for the request.

23. The method of claim 1, further comprising, after (B)(2):
   (C)(1) a third server determining information about said least one delivery server; and
   (C)(2) based on said determining in (C)(1), said third server providing said least one delivery server with said second network traffic from said client.

24. The method of claim 23 wherein said third server is the same as said first contact server.

25. A non-transient computer-readable medium having program instructions stored thereon, the program instructions, operable on a computer system in a content delivery network (CDN), the program instructions, when executed on a processor in the CDN, performing:
   (A)(1) a first contact server receiving a request from a client for particular content;
   (A)(2) determining at least one delivery server in said CDN;
   (A)(3) said first contact server providing said at least one delivery server with first network traffic from said client, wherein said first network traffic comprises an indication of the request for particular content, and wherein said at least one delivery server is configured to spoof an address of said first contact server; and then (B)(1) a second contact server, distinct from the first contact server, determining information about said at least one delivery server; and then, (B)(2) based on said determining in (B)(1), said second contact server providing said at least one delivery server with second network traffic from said client, wherein said first contact server and said second contact server are not configured to serve content, and wherein said at least one delivery server serves at least some of the particular content to the client.

* * * * *